(12) United States Patent
Holecek et al.

(10) Patent No.: US 7,478,326 B2
(45) Date of Patent: Jan. 13, 2009

(54) WINDOW INFORMATION SWITCHING SYSTEM

(75) Inventors: Ales Holecek, Bellevue, WA (US); Charles W. Stabb, Seattle, WA (US); Cornelis K. Van Dok, Bellevue, WA (US); Hillel N. Cooperman, Seattle, WA (US); Jeffrey W. Pettiross, Seattle, WA (US); Mark R. Ligameri, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 79 days.

(21) Appl. No.: 11/036,610

(22) Filed: Jan. 18, 2005

(65) Prior Publication Data

US 2006/0161847 A1    Jul. 20, 2006

(51) Int. Cl.
 *G06F 3/00* (2006.01)
 *G06F 3/048* (2006.01)

(52) U.S. Cl. .................. 715/716; 715/766; 715/781; 715/838

(58) Field of Classification Search ................ 715/781, 715/729, 790, 792, 793, 716, 794
See application file for complete search history.

(56) References Cited

U.S. PATENT DOCUMENTS

| | | | |
|---|---|---|---|
| 4,651,146 A | 3/1987 | Lucash | |
| 4,653,020 A | 3/1987 | Cheselka | |
| 4,862,389 A | 8/1989 | Takagi | |
| 5,412,776 A | 5/1995 | Bloomfield | |
| 5,463,726 A * | 10/1995 | Price | ........................ 715/797 |
| 5,499,334 A | 3/1996 | Staab | |
| 5,546,528 A | 8/1996 | Johnston | |
| 5,651,107 A | 7/1997 | Frank | |
| 5,668,962 A | 9/1997 | Kitami | |
| 5,758,110 A | 5/1998 | Boss | |
| 5,841,435 A * | 11/1998 | Dauerer et al. | ............... 715/775 |
| 5,874,960 A | 2/1999 | Mairs | |
| 5,880,733 A | 3/1999 | Horvitz | |
| 5,889,517 A | 3/1999 | Ueda et al. | |
| 5,892,511 A | 4/1999 | Gelsinger | |
| 5,920,316 A | 7/1999 | Oran | |
| 6,008,809 A | 12/1999 | Brooks | |
| 6,031,530 A | 2/2000 | Trueblood | |
| 6,040,833 A | 3/2000 | Henshaw | |
| 6,072,488 A | 6/2000 | McFarland | |

(Continued)

OTHER PUBLICATIONS

IronBytes, AltSwitch, Oct. 2004, (Webarchive: http://web.archive.org/web/20041014013718/www.ironbytes.com/index.html).*

(Continued)

*Primary Examiner*—Kieu D Vu
*Assistant Examiner*—David Phantana-angkool
(74) *Attorney, Agent, or Firm*—Shook, Hardy & Bacon L.L.P.

(57) ABSTRACT

A method for displaying at least one visualization of windows on a display screen is described. The method includes steps of receiving an input corresponding to a request to access visualizations of windows for a plurality of windows, and for each window of the plurality of windows, displaying a visualization of at least a portion of the content of the window in an area separately defined from the plurality of windows, wherein the at least a portion of the content includes dynamic video content. Another method provides for grouping and ordering the visualizations when displayed. Another method allows for display of visualizations related to child and/or parent windows.

16 Claims, 16 Drawing Sheets

U.S. PATENT DOCUMENTS

| | | | |
|---|---|---|---|
| 6,108,714 A * | 8/2000 | Kumagai et al. | 719/310 |
| 6,160,554 A | 12/2000 | Krause | |
| 6,166,736 A | 12/2000 | Hugh | |
| 6,184,883 B1 | 2/2001 | Bates | |
| 6,215,490 B1 * | 4/2001 | Kaply | 715/788 |
| 6,229,542 B1 | 5/2001 | Miller | |
| 6,239,798 B1 | 5/2001 | Ludolph | |
| 6,272,484 B1 * | 8/2001 | Martin et al. | 707/1 |
| 6,313,855 B1 | 11/2001 | Shuping | |
| 6,321,209 B1 * | 11/2001 | Pasquali | 705/14 |
| 6,429,855 B2 | 8/2002 | Pabon | |
| 6,429,883 B1 | 8/2002 | Plow | |
| 6,549,218 B1 | 4/2003 | Gershony | |
| 6,577,330 B1 | 6/2003 | Tsuda | |
| 6,590,594 B2 * | 7/2003 | Bates et al. | 715/784 |
| 6,686,938 B1 | 2/2004 | Jobs et al. | |
| 6,720,982 B1 | 4/2004 | Sakaguchi | |
| 6,734,873 B1 | 5/2004 | Herf | |
| 6,781,611 B1 | 8/2004 | Richard | |
| 6,957,395 B1 | 10/2005 | Jobs | |
| 6,988,135 B2 * | 1/2006 | Martin et al. | 709/224 |
| 6,996,783 B2 | 2/2006 | Brown | |
| 7,028,264 B2 * | 4/2006 | Santoro et al. | 715/765 |
| 7,047,500 B2 * | 5/2006 | Roelofs | 715/779 |
| 7,119,819 B1 | 10/2006 | Robertson | |
| 7,146,573 B2 | 12/2006 | Brown | |
| 7,250,955 B1 | 7/2007 | Beeman | |
| 2001/0028368 A1 | 10/2001 | Swartz | |
| 2001/0035882 A1 | 11/2001 | Stoakley | |
| 2002/0190904 A1 | 12/2002 | Cohen | |
| 2003/0142140 A1 | 7/2003 | Brown | |
| 2003/0164862 A1 * | 9/2003 | Cadiz et al. | 345/838 |
| 2003/0179237 A1 | 9/2003 | Nelson | |
| 2003/0210270 A1 | 11/2003 | Clow | |
| 2004/0066408 A1 | 4/2004 | Meyers et al. | |
| 2004/0174396 A1 | 9/2004 | Jobs et al. | |
| 2004/0212640 A1 * | 10/2004 | Mann et al. | 345/792 |
| 2004/0255254 A1 | 12/2004 | Weingart | |
| 2004/0261038 A1 * | 12/2004 | Ording et al. | 715/792 |
| 2004/0261039 A1 | 12/2004 | Pagan | |
| 2005/0091597 A1 * | 4/2005 | Ackley | 715/716 |
| 2005/0132299 A1 | 6/2005 | Jones | |
| 2005/0210388 A1 * | 9/2005 | Matsumoto | 715/719 |
| 2005/0210410 A1 * | 9/2005 | Ohwa et al. | 715/821 |
| 2005/0223334 A1 * | 10/2005 | Guido et al. | 715/794 |
| 2005/0235209 A1 * | 10/2005 | Morita et al. | 715/716 |
| 2006/0041846 A1 | 2/2006 | Masselle | |
| 2006/0123353 A1 | 6/2006 | Matthews | |

OTHER PUBLICATIONS

Shareup, AltSwitch Review, Sep. 2004 (http://www.shareup.com/AltSwitch-download-21278.html).*

SoftSea, AltSwitch Review, Oct. 2004 (http://www.softsea.com/review/AltSwitch.html).*

WinGlance, Jul. 2004, http://winglance.usablelabs-com.qarchive.org/.*

"New release WinPLOSION V.2," printed page from Internet on Nov. 2, 2004, http://www.winplosion.com/.

"Exposé, Find the window you need. Now,", printed page from Internet on Nov. 2, 2004, http://www.apple.com/macosx/features/expose/.

Pro/, "Tip of the Week: Changing Apps in a Big Way," printed page from Internet on Jan. 4, 2005, http:www.apple.com/pro/tips/changingapps.html.

"Microsoft PowerToys for Windows XP," Features described as "Alt-Tab Replacement," date unknown, printed from website http://www.microsoft.com/windowsxp/downloads/powertoys/xppowertoys.mspx.

The TaskGallery, http://research.microsoft.com/ui/TaskGallery.

Shneiderman, Ben, "Treemaps for space-constrained visualization of hierarchies," Dec. 26, 1998, (updated May 18, 2004), 10 pages, printed from the internet on Nov. 2, 2004, http://www.cs.umd.edu/hcil/treemap-history/.

Project Looking Glass Sun Microsystems, Nov. 8, 2004, 9 pages, http://www.sun.com/software/looking_glass/.

"Safari, The fastest browser on the Mac - the best browser on any platform.", printed from the Internet on Nov. 4, 2004, http://www.apple.com/safari/ , 3 pages.

"Opera Software," printed from Internet on Nov. 4, 2004, http://www.opera.com/features/index.dml, 8 pages.

"Mozilla," printed from Internet on Nov. 4, 2004, http://www.mozila.org/products/firefox/tabbed-browsing.html, 3 pages.

"Exposé- Find the window you need. Now." Apple-Mac OS X - Features - Exposé, Nov. 2, 2004, 2 pages, http://www.applie.com/macosx/features/expose/.

* cited by examiner

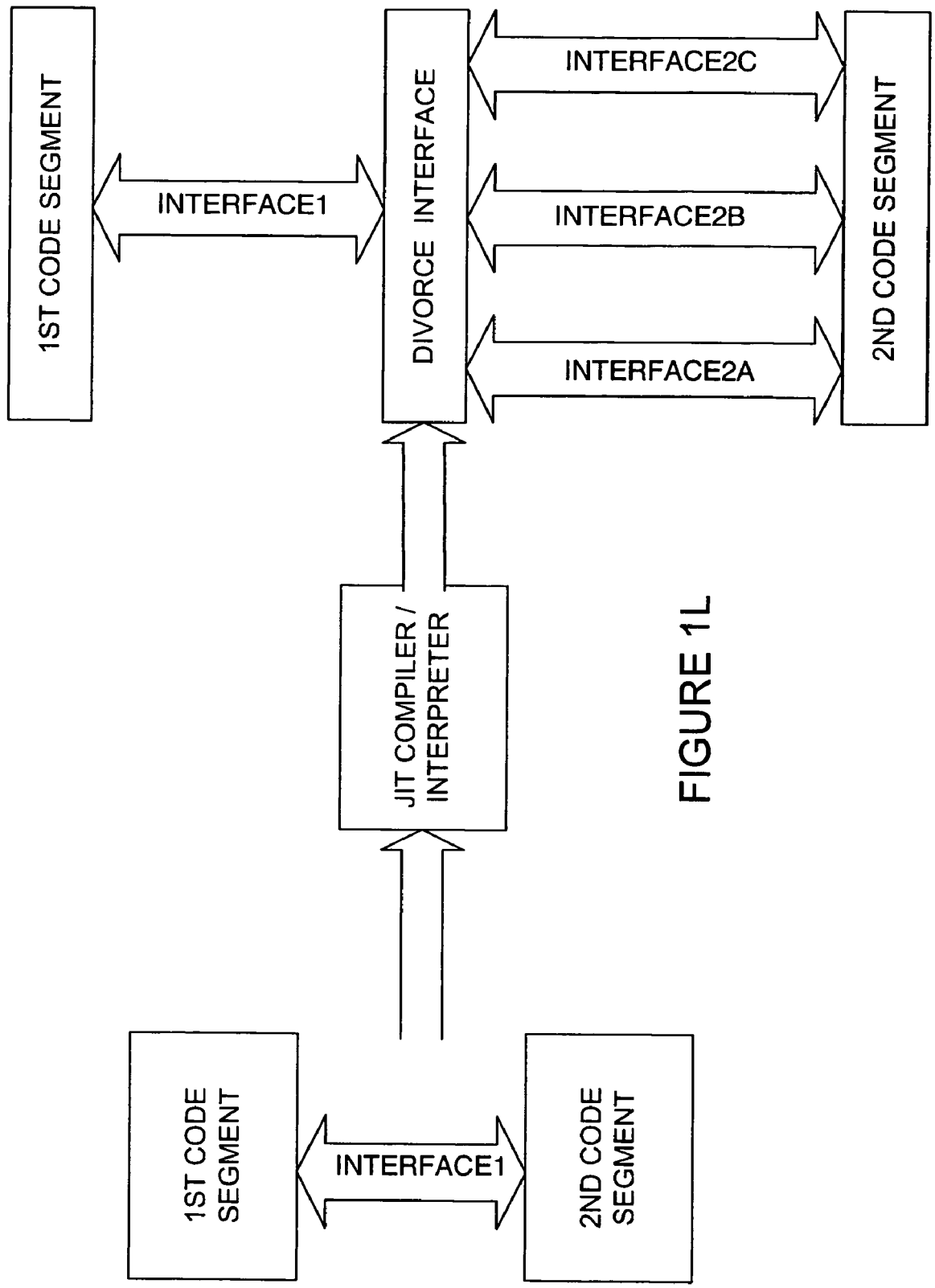

WINDOW INFORMATION SWITCHING SYSTEM

FIELD OF THE INVENTION

Aspects of the present invention are directed generally to window arrangements in an operating system. More particularly, aspects of the present invention are directed to a method and system for browsing window information for multiple windows in an operating system while allowing a user to switch to any particular window.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper.

When multiple windows are open at the same time, switching quickly to the desired window can be difficult. For example, the desired window may be partially or fully occluded by other open windows. Also, the desired window may be minimized or hidden.

Modern operating systems offer a fast way to switch among recently used windows. Current versions of the Windows® brand operating system by Microsoft® Corporation of Redmond, Wash. include the Alt-Tab key combination, Task List, and Taskbar, which when selected presents a list of open windows in a representation different from the primary windows. In particular, with respect to the Alt-Tab key combination, this is done by holding down the Alt key on a keyboard and repeatedly pressing the Tab key before releasing the Alt key. Each press of the Tab key moves the focus of this action to the next older window, where age is defined by how recently the window was active. A single key or key combination is a commonly used operating system feature.

Window selection interfaces have been proposed to minimize the necessity to sort through the various open windows. Similar user interfaces exist in the Mac OS X brand operating system by Apple Computing, Inc. of Cupertino, Calif. including Apple-Tab and the Dock in which a list of windows in are provided in a representation different from the primary window. Each of the aforementioned user interfaces restate or reformulate the open windows into a type of list. These interfaces however, do not allow the user to view content of a window without the window being selected.

Recently, Apple Computing, Inc. introduced Exposé in the Mac OS X brand operating system. Exposé provides a user with the ability to display all open windows as thumbnails on the desktop. In operation, when the user types the F9 key, Exposé tiles all the open windows, that is it scales the windows down to a size such that all the open windows are displayed in a non-overlapping form. In another aspect, Exposé provides a user with the ability to display/view all open windows for one particular application in a non-overlapping manner. Specifically, when the user types the F10 key, Exposé tiles all of the open windows for the current application in a non-overlapping form while fading to a gray all of the open windows associated with other applications.

While Exposé allows the user to view open windows simultaneously, multiple windows are tiled on the screen, which can still lead to some confusion. Further, display of a thumbnail with live video content is not possible as the tiled windows are merely snapshots of the content of the window when the user initiated the tiled action. It would be helpful to provide an interface which allows a user to scan quickly through open windows and have additional information provided to the user to quickly switch to a desired window.

SUMMARY OF THE INVENTION

There is therefore a need for a method for displaying at least one visualization of open windows on a display where the visualizations include live and/or dynamic content. The method may include steps of receiving an input corresponding to a request to access visualizations of windows for a plurality of windows, and for each window of the plurality of windows, displaying a visualization of at least a portion of the content of the window in an area separately defined from the plurality of windows, wherein the at least a portion of the content includes live and/or dynamic video content.

Another aspect of the invention provides for the display of visualizations in groups and/or in a predefined order. The order may be determined by the system and/or by a user. Still another aspect of the invention provides for a method of displaying child window visualizations corresponding to a parent window. In the case of tabbed windows that are associated with each other, the method allows for the display of some or all of the parent and child window visualizations.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 1B through 1M show a general-purpose computer environment supporting one or more aspects of the present invention;

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
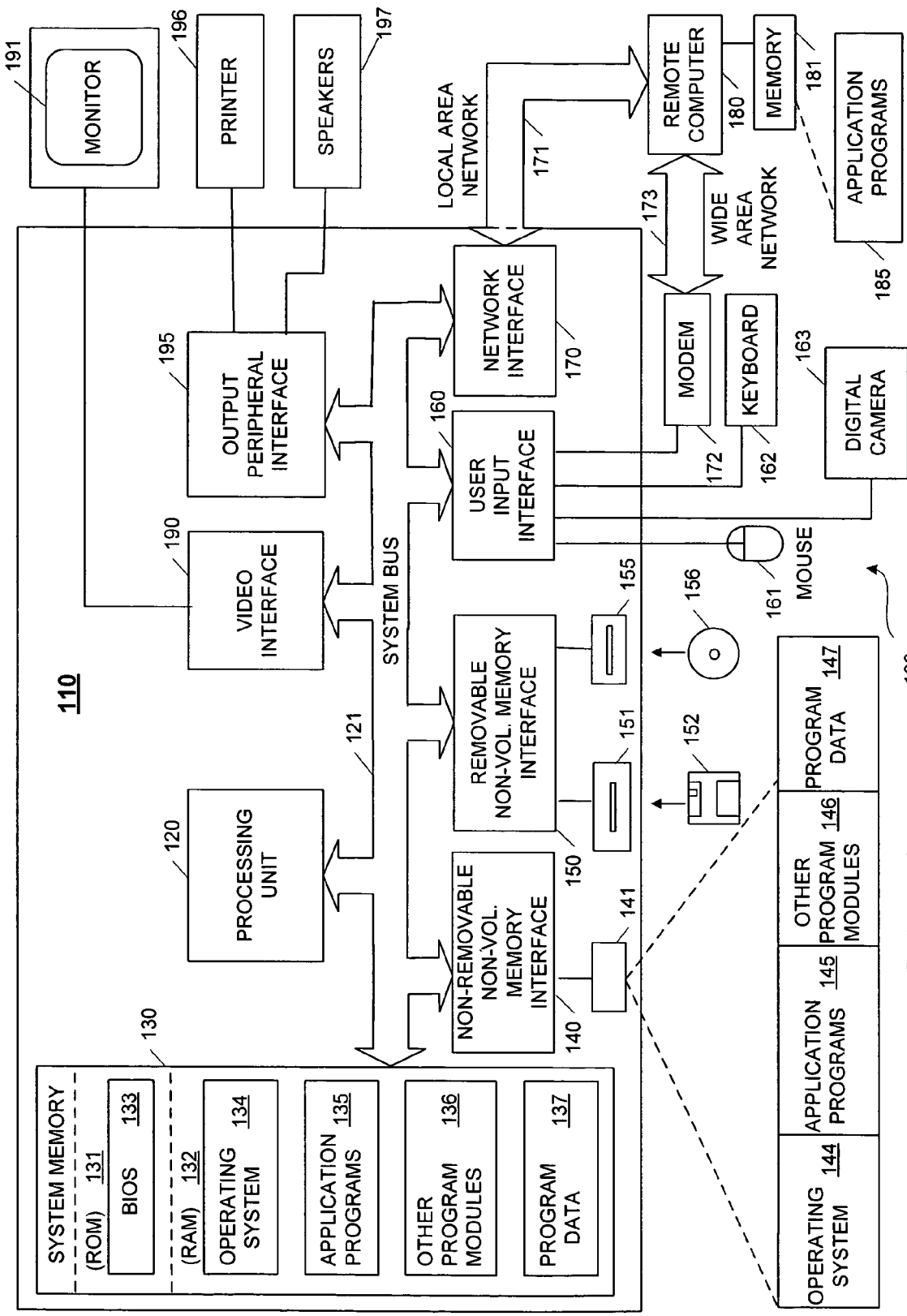
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
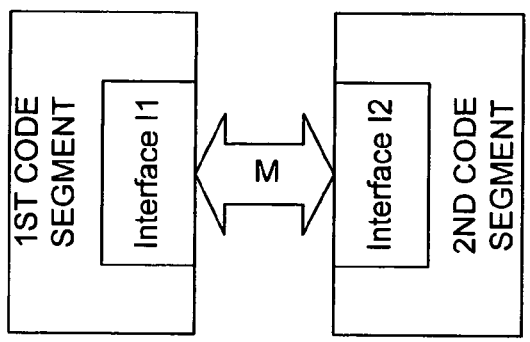
Figure 1E:
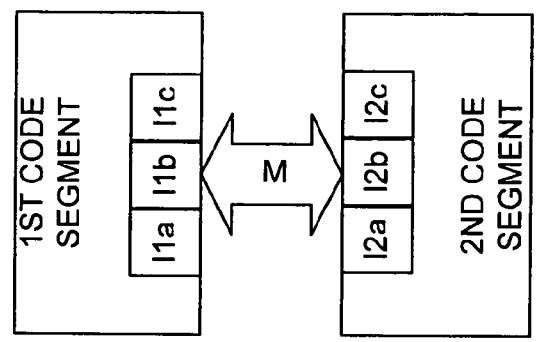
Figure 1B:
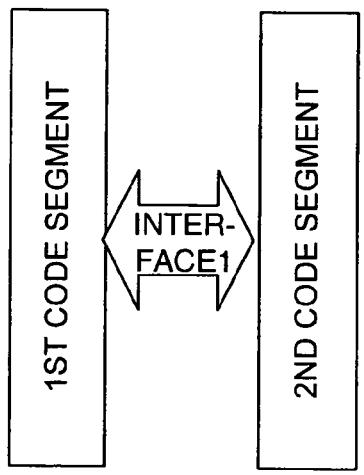

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
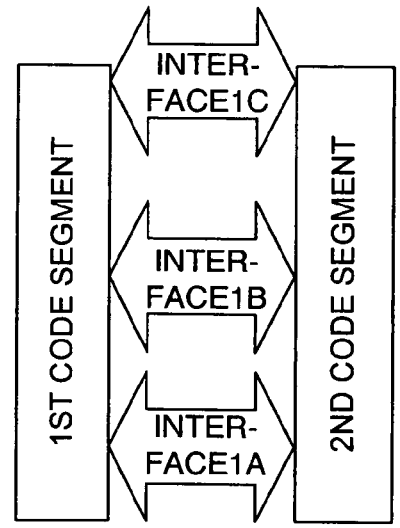

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1G:
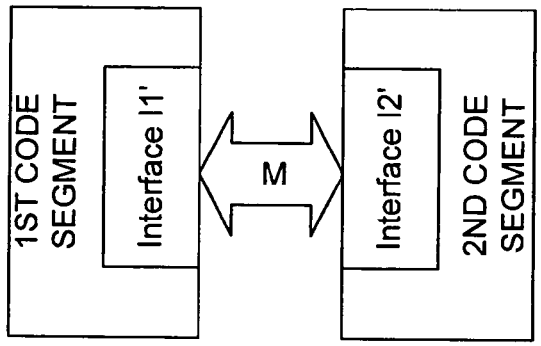
Figure 1I:
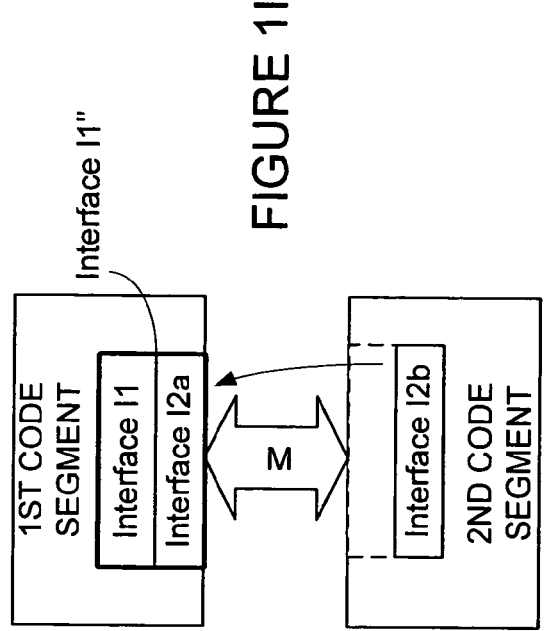
Figure 1F:
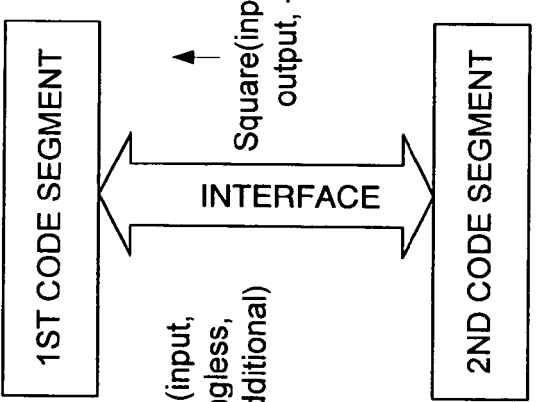

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
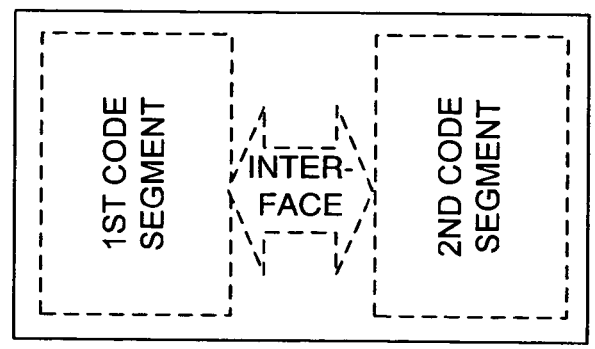

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
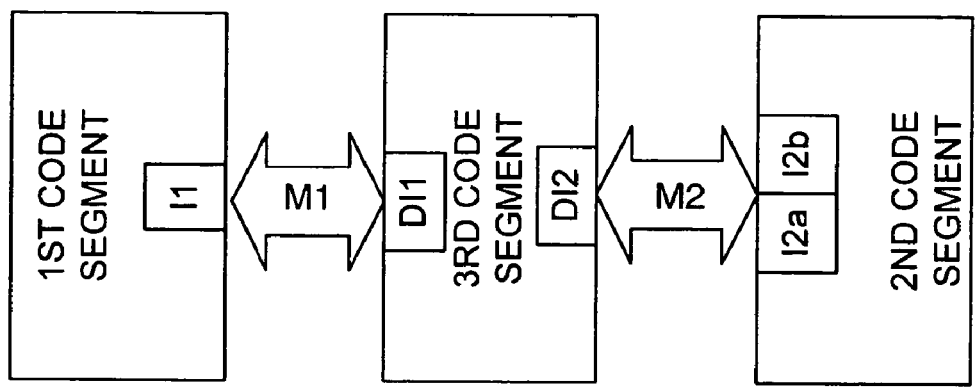
Figure 1J:
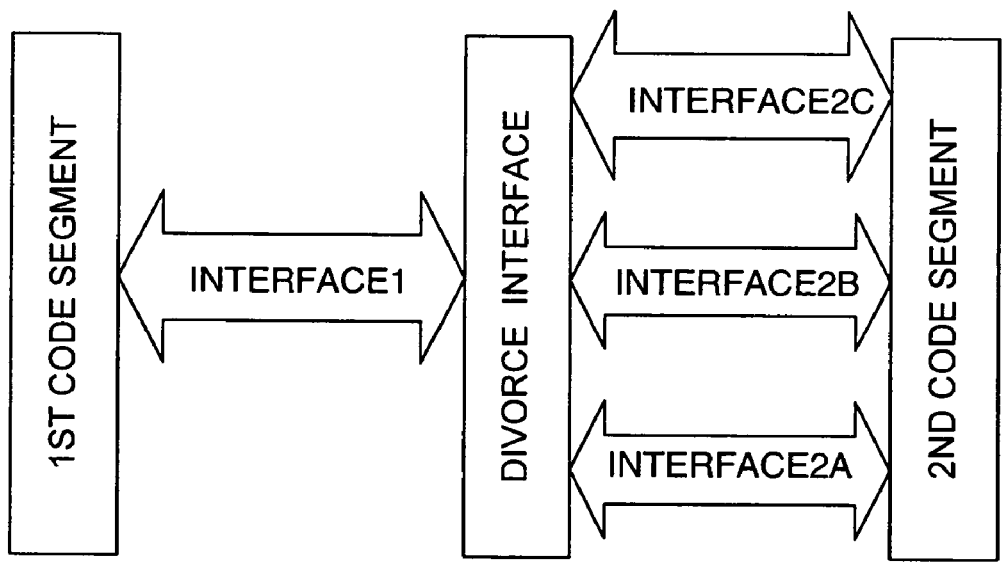

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1M:
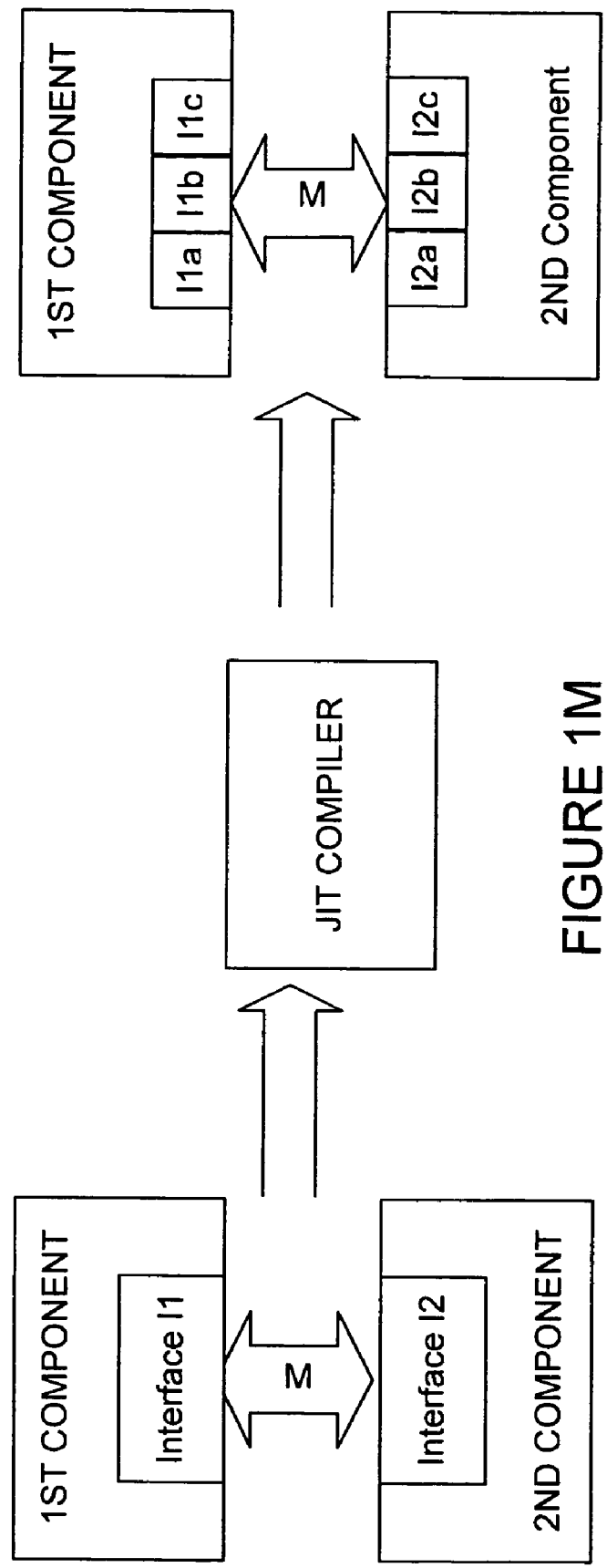

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
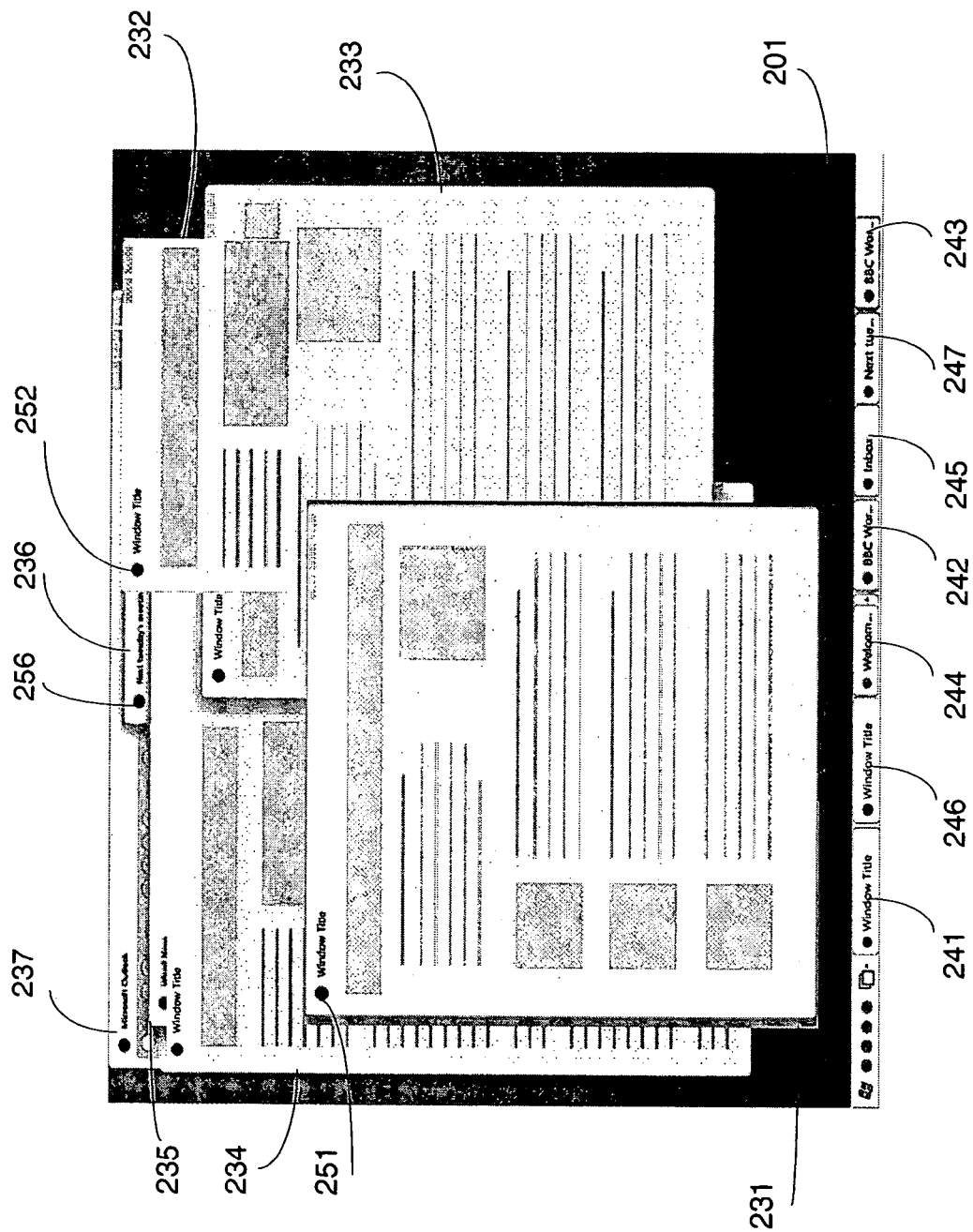
FIG. 2 illustrates a desktop space with multiple open windows overlapping each other.

FIG. 2 illustrates a desktop space 201 with multiple open windows overlapping each other. Various windows 231, 232, 233, 234, 235, 236, and 237 are shown in a Z-order orientation. It should be understood by those skilled in the art that the Z-order of an orientation of windows is very well known in the art. Window 231 is shown higher in the Z-order compared to windows 232 to 237. Window 232 is shown higher in the Z-order compared to windows 233 to 237. Window 233 is shown higher in the Z-order compared to windows 234 to 237. Window 234 is shown higher in the Z-order compared to windows 235 to 237. Window 235 is shown higher in the Z-order compared to windows 236 and 237, and window 236 is shown higher in the Z-order compared to window 237. Window 237 is shown at the bottom of the Z-order. As used herein, the term "orientation" is defined herein to include adjustments to the visual appearance of a window or group of windows, such as the size or shape of the window and a shared common border between or around at least two windows.

Desktop space 201 is an area of a display that allows for the display of windows corresponding to application programs. The taskbar at the bottom indicates which windows are currently in use, which may be visible or minimized. A taskbar is a specific implementation of an on-screen window remote control used to list and enable manipulation of windows, such as activating, moving, hiding, and minimizing. Window 231 may be represented by taskbar button 241. Window 232 may be represented by taskbar button 242. Window 233 may be represented by taskbar button 243. Window 234 may be represented by taskbar button 244. Window 235 may be represented by taskbar button 245. Window 236 may be represented by taskbar button 246. Window 237 may be represented by taskbar button 247. As shown in this example, all seven of the windows are shown open. Although only seven windows are shown, it should be understood that more or fewer windows may be open. The taskbar button order may indicate the order in which the corresponding windows were first opened. For example, window 233 is the third window from the top of the Z-order while, as shown by its corresponding taskbar button 243, window 233 was the last window that was opened in comparison to the other six windows. Alternatively, the taskbar button order may not be the same order as the Z-order.

Each of windows 231-237 includes an indicium 251-257, respectively, corresponding to the application program using the window. Each window 231-237 is shown to include an indicium 251-257 although only indicium 251, 252, and 256 are identified in FIG. 2. It should be understood by those skilled in the art that any particular window 231-237 may or may not include a corresponding indicium 251-257.

For the windows 231-237 shown in FIG. 2, it is difficult to easily determine the different windows that are open and where any particular window is in the Z-order. In some orientations, one or more windows may completely obscure an underlying window in the Z-order. In such a case, a user can not even see the underlying window. Further, in some cases, the on-screen window remote control area, such as the taskbar area, may be hidden when not in use. As such, a user would not even be able to quickly see the taskbar buttons 241-247 without moving a mouse pointer to activate the taskbar area.

Figure 3:
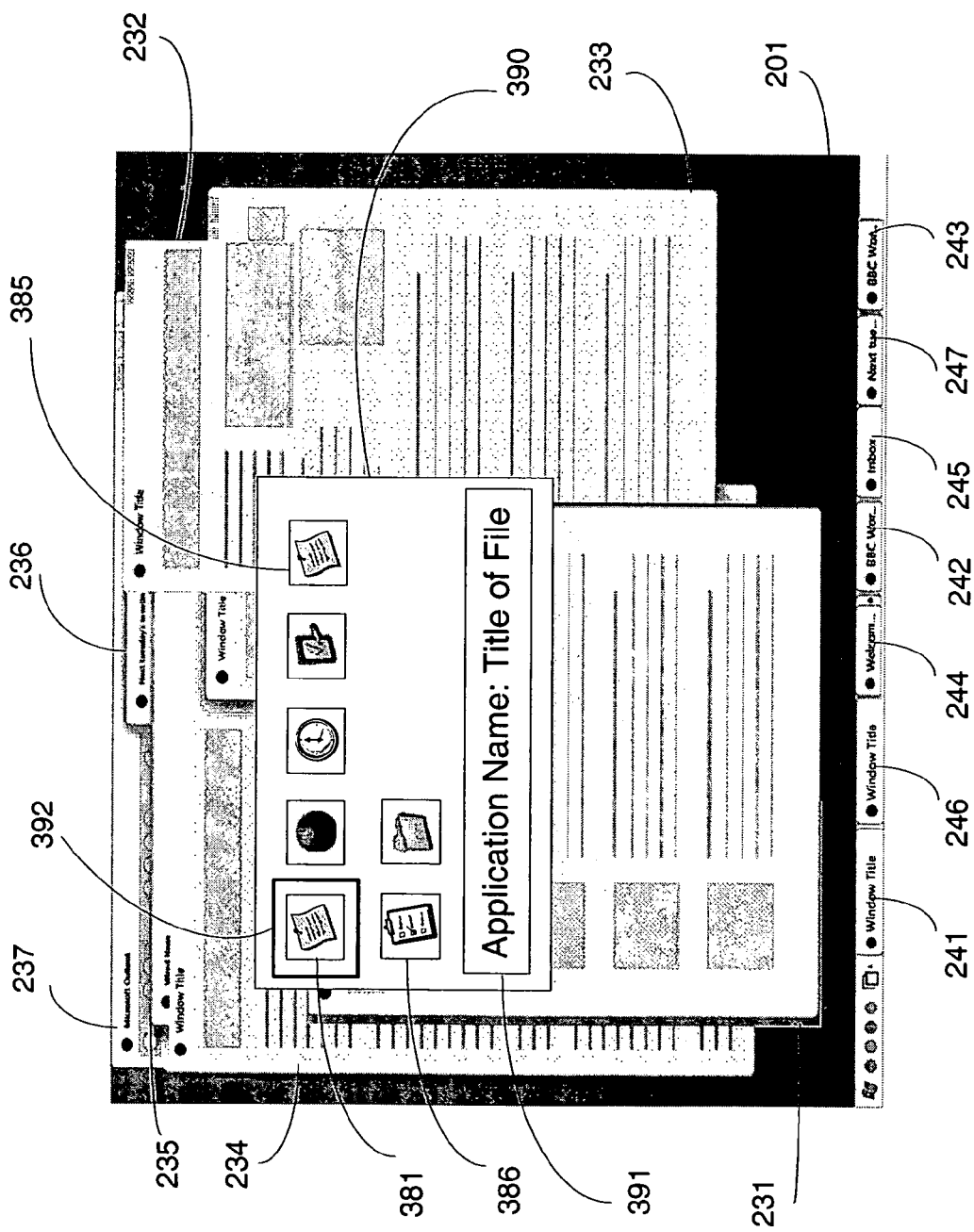
FIG. 3 illustrates an open applications box with multiple open window application icons shown.

As shown in FIG. 3, a user has initiated an action to access an information area 390 that provides a quick reference guide as to windows that are open. Information area 390 appears when an input is received to initiate the access action. When using the Windows® operating system by Microsoft® Corporation of Redmond, Wash., a user can depress certain predefined keys on a keyboard to initiate the action. For example, a user may depress and hold the Alt key on the keyboard. Then, upon depressing the Tab key, she can see the information area 390. By successively pressing the Tab key, she then can move through the various window icons to find the particular window that she wants to access. For example, as shown in FIG. 3, information area 390 includes icons 381, 385, and 386 corresponding to windows 231, 235, and 236 that are open. It should be noted that only icons 381, 385, and 386 are specifically referenced in FIG. 3; however, each of windows 231-237 has a corresponding icon in the information area 390. Icon 381 is merely an icon or other indicium to identify the application program using the window corresponding to the icon. For example, icon 381 may be an icon corresponding to an application program for word processing. As described, icon 381 corresponds to a particular window 231 under operation by an application program. As shown by the same icon 385, window 235 also is under operation by the same application program. In this example, there are two word processing windows open for two different files.

Information area 390 also includes a description field 391. Description field 391 identifies the program application name and the title of the file within the corresponding window. For example, highlight box 392 identifies icon 381 as a currently selected icon. In the case of the Windows® operating system using the Alt-Tab keys, a user may have stopped pressing the Tab key once she stopped on icon 381. As icon 381 is highlighted, the name of the application program, such as Microsoft® Word 2002 by Microsoft® Corporation, may be shown in description field 391. The title of the file may also be shown in the description field 391.

Figure 4A:
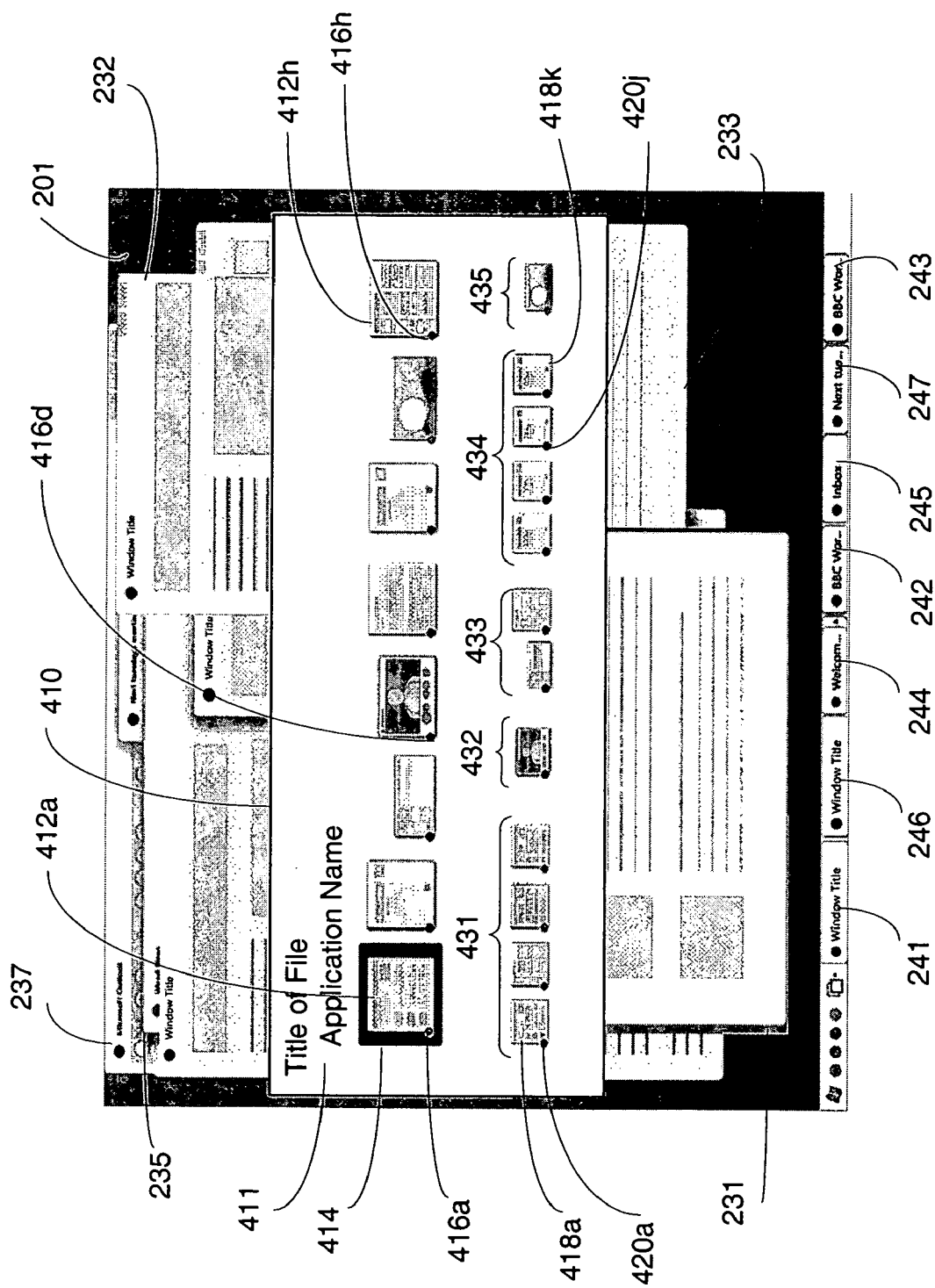
FIGS. 4A-4C illustrate examples of a window information switching system in accordance with at least one aspect of the present invention.
Figure 4B:
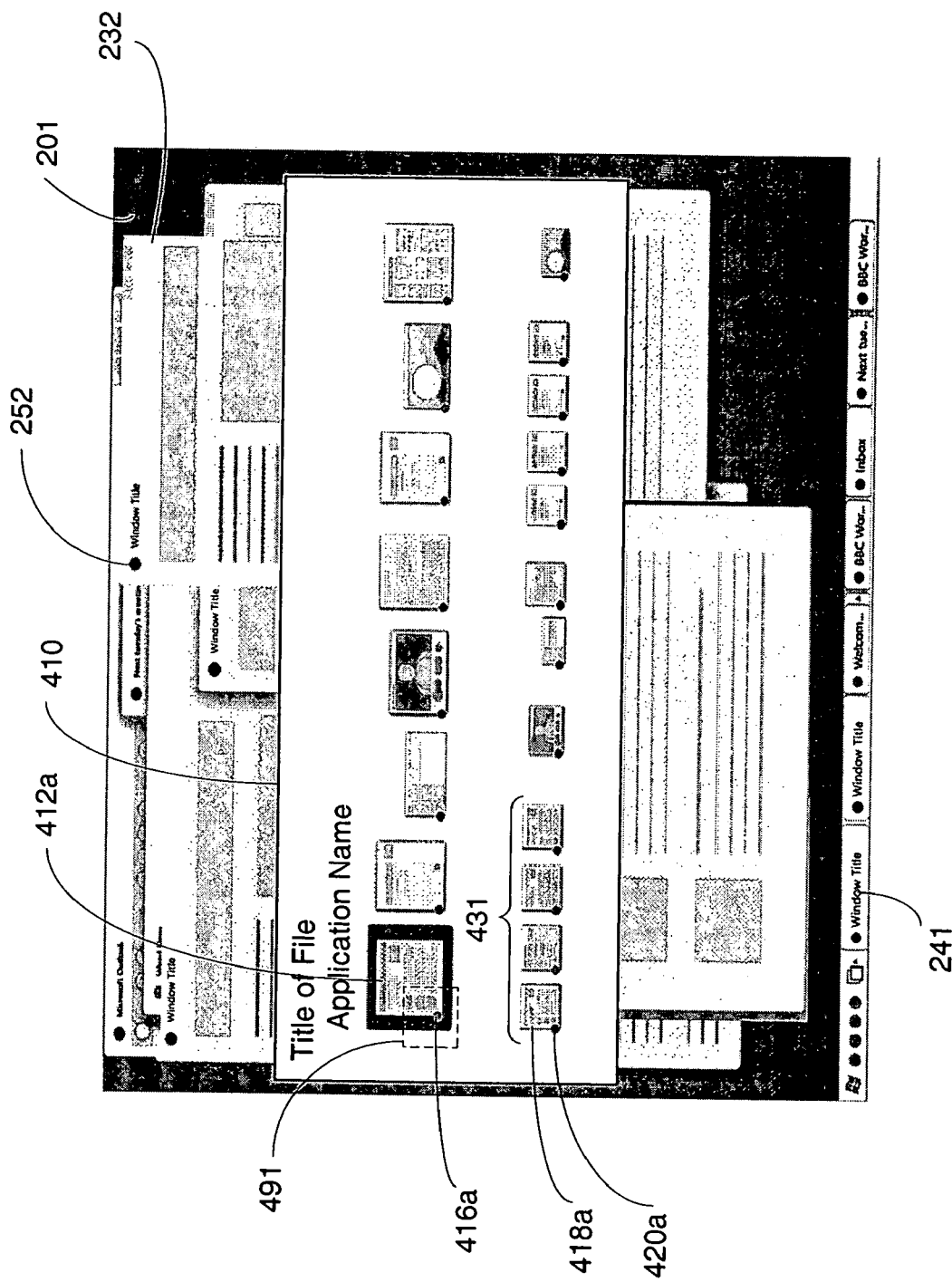
Figure 4C:
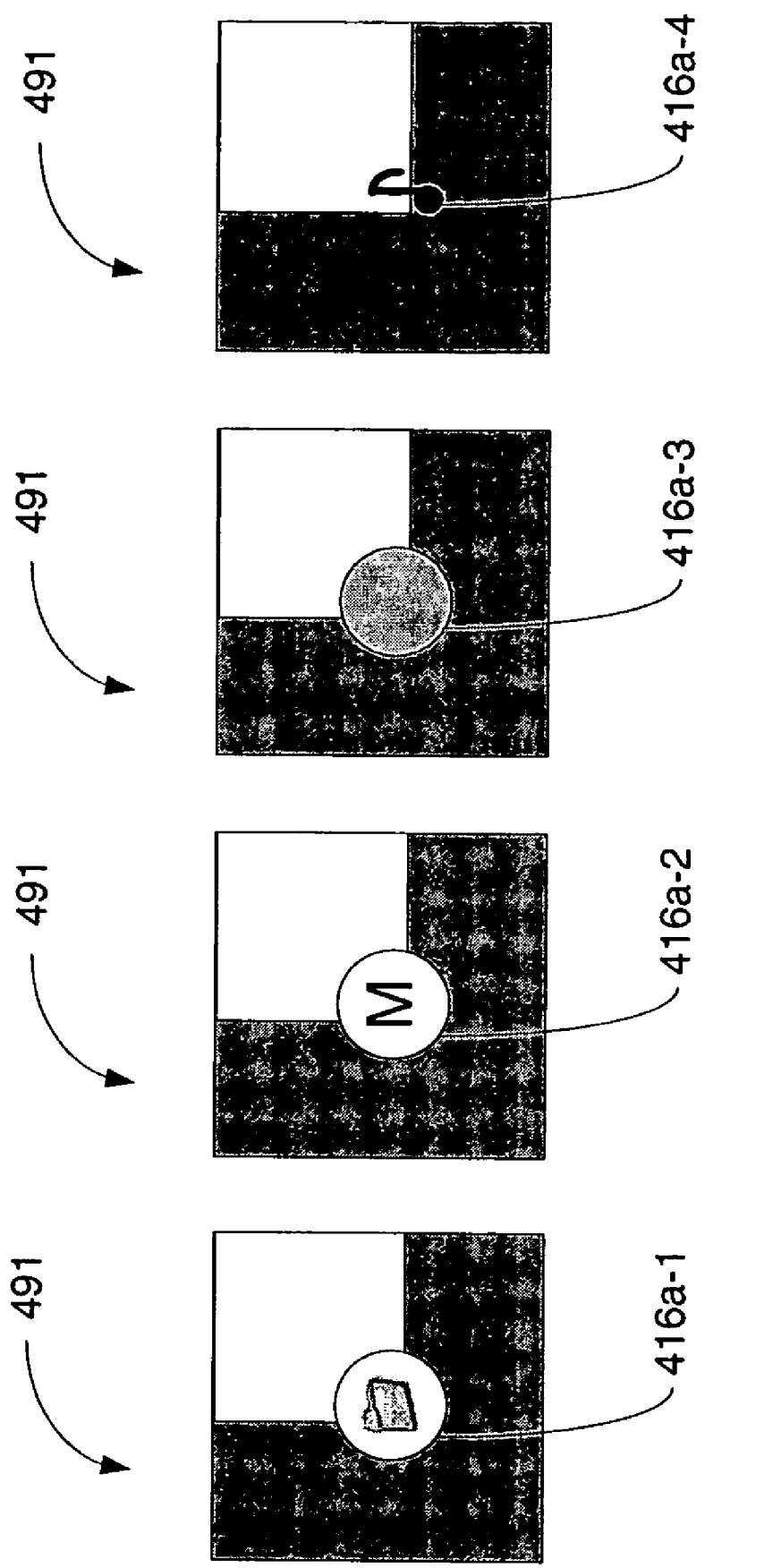

FIGS. 4A-4C illustrate examples of a window information switching system in accordance with at least one aspect of the present invention. FIG. 4A shows the same seven windows 231-237 with corresponding taskbar buttons 241-247 in the taskbar area. Similar to information area 390 in FIG. 3, information area 410 may appear when an input is received to initiate the access action. Once again, the Alt-Tab key sequence of Windows® operating system may be used and/or some other single activation switch or combination of activation switches. Information area 410 includes a number of window thumbnails 412a and 412h and 418a and 418k. It should be noted that only window thumbnails 412a, 412h, 418a, and 418k are specifically referenced in FIG. 4A; however, each of windows 231-237 has a corresponding window thumbnail in the information area 410. Window thumbnails may show a small preview of the live and/or dynamic content of each window. A window thumbnail may include at least a portion of the content of a corresponding open window. Further, a window thumbnail may include live and/or dynamic data, such as streaming video and/or audio. Window thumbnails 412 and 418 may be snapshot images or they may be thumbnails of the live and/or dynamic content.

Any of window thumbnails 412 and 418 may include a small version of an indicium 416 and 420 of the window overlaid over a corner of the thumbnail. By adding thumbnails, users can now choose more quickly among windows, especially when the windows have identical or similar indicium, either because of similar design or because there are multiple windows of a single application open. Thumbnails 412a and 412h in the top row are shown larger in size than the other thumbnails 418a and 418k.

The size of the thumbnails may or may not be the same for all windows, and different algorithms may be used to vary their size. For example, the thumbnails could all be presented at the same height, or they could have a scaling factor determined by a choice of a user in an options dialog. Other visualizations besides thumbnails may be used as well, or in combination with each other and thumbnails. For example, either a scaled or unscaled clip of a portion of the window or a custom small representation provided by application program of a window may be used.

The order of the windows may change and some windows may be duplicated. The contents of information area 410 are now organized in two rows. The first row, shown as a single row across the top of the window, may be the most recently used windows, similar to the order as they are presented in the Windows® operating system today. As described above, after the top set of window visualizations, any other open windows open may be presented as smaller thumbnails in a second row. This ordering and grouping may be configured by a user.

Further, the thumbnails in the first row may appear again as duplicates in the second row, but may be grouped and ordered to reinforce what is already in the on-screen window remote control area. As such, different logical arrangements may be used for grouping and ordering any of the windows. Other alternative ordering and grouping methods may be used here as well. One embodiment may be implemented such that windows only appear once in this list, instead of having two entries for the windows that are most recently used.

The thumbnails 418a and 418k in the bottom row also are shown in groups 431 and 434 respectively. Groups 432, 433, and 435 are other groupings of thumbnails. As described above, groups 431-435 may be defined by any of a number of criteria, such as windows sharing a common application program, windows that have been grouped together by a user and/or program, and windows that share a similar filename.

Information area 410 also may include a description field 411. Just as description field 391 in FIG. 4, description field 411 identifies the program application name and the title of the file within the corresponding window. For example, highlight box 414 identifies window thumbnail 412a as a currently selected window thumbnail.

FIG. 4B is FIG. 4A with a portion 491 identified. FIG. 4C shows illustrative examples of portion 491 in an exploded view format. As shown in FIG. 4C, portion 491 includes a small version of an indicium 416 of window 231 overlaid over a corner of the thumbnail 412a. Examples of indicium 416 include an icon image 416a-1, a textual image 416a-2, an image based on a color specific to an application program 416a-3, a user specific image 416a-4, and some other indicium, such as a logo of an application program.

Under conventional window information systems, a user can only switch to top-level windows. Some windows, however, are called child windows, because they are part of a group of windows inside some type of container. One example of such a container is a multiple document interface (MDI) application, where an application program, such as Microsoft® Excel, has a single top-level, or parent, window and multiple document, or child, windows open inside that one. An alternative to MDI is a Single Document Interface (SDI) in which each window contains one file, but there may be multiple windows open on a display screen to display several files at once. Another example of a container is a tabbed window group, either inside an application program or at an operating system level. In some situations when tabs are used to manage windows, the term Tabbed Document Interface (TDI) has been used.

Figure 5:
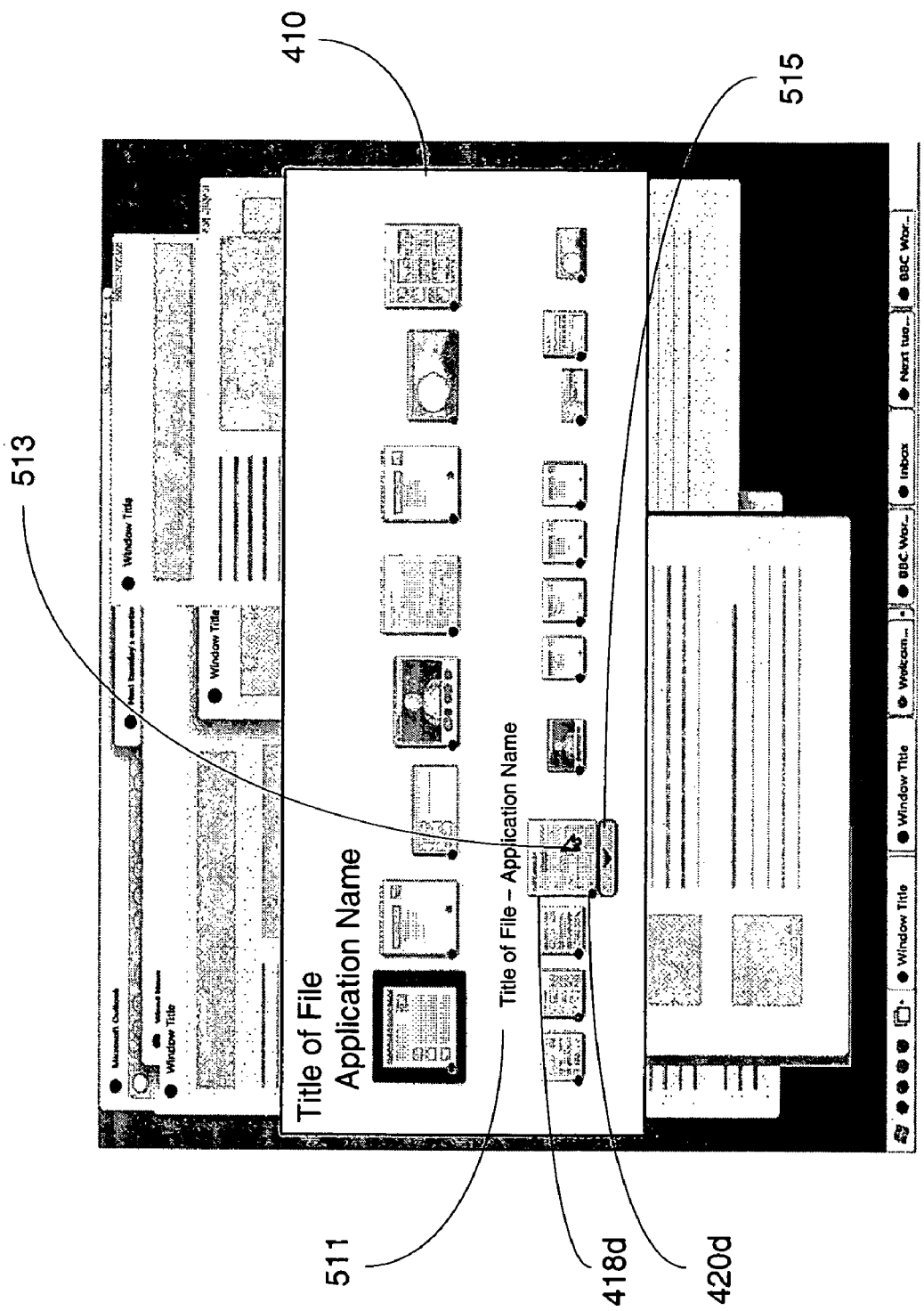
FIGS. 5 and 6 illustrate an example of a window information switching system allowing a user to drill down into window groups in accordance with at least one aspect of the present invention.

In accordance with one aspect of the present invention, a user has access to both parent and child windows. For example, FIG. 5 illustrates an example of a window information switching system allowing a user to drill down into window groups in accordance with at least one aspect of the present invention. As shown, when a user moves her mouse pointer 513 over or within a predefined area of thumbnail window 418d, two operations may occur. First, description field 511 appears identifying the title of the file and the name of the underlying application program which may be used by the user to switch to a particular window. Second, because thumbnail window 418d is a parent window, a menu switch 515, like a dropdown menu button, may appear when the thumbnail window 418d gets focus, e.g., the mouse pointer is within a predefined area of the thumbnail window 418d. It should be understood by those skilled in the art that the dropdown menu shown in FIG. 5 is merely illustrative of one example of a type of menu switch 515 and that the present invention is not so limited to the examples herein. For example, a child window list may be accessed by using a keyboard.

Figure 6:
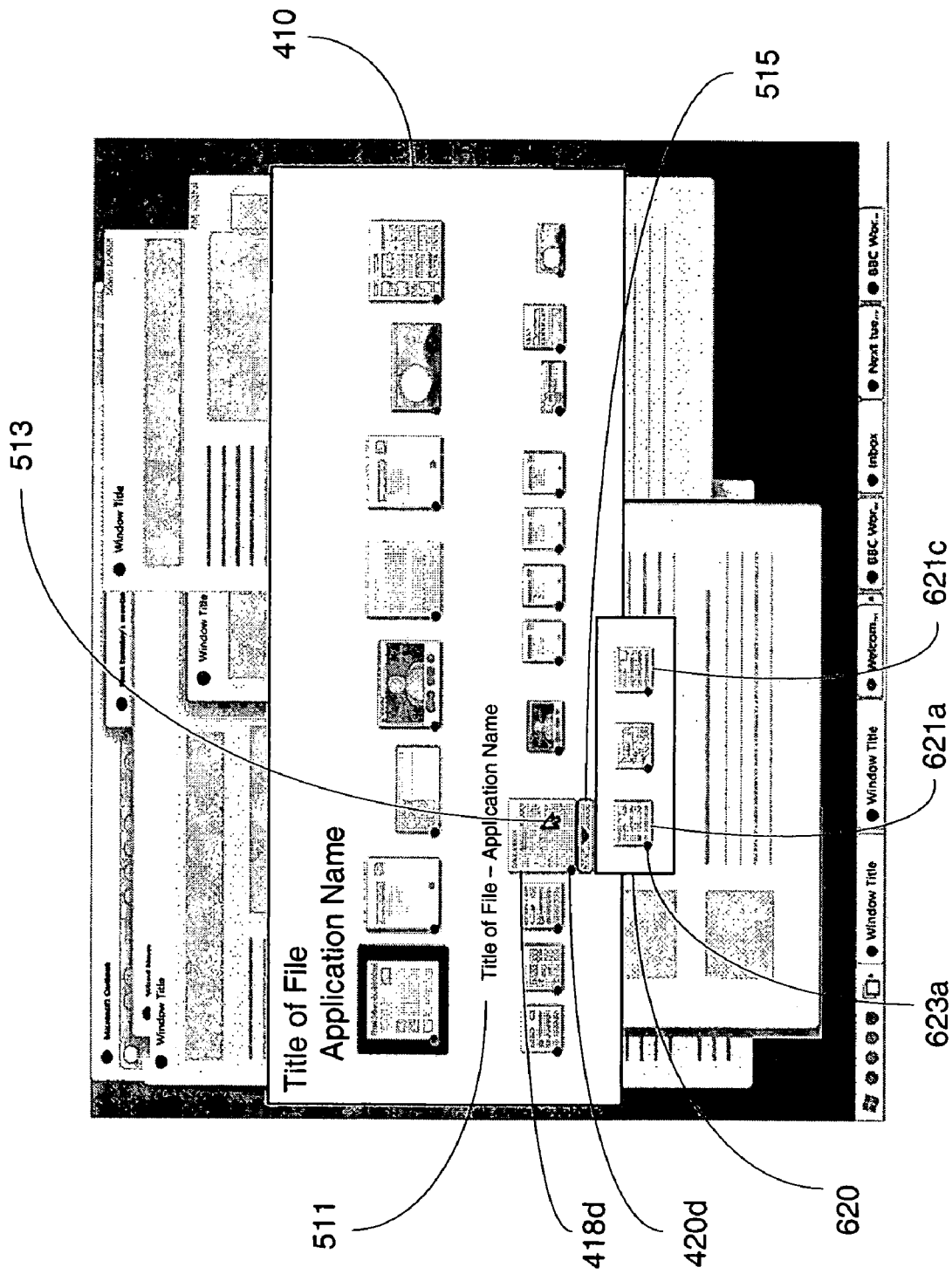

FIG. 6 illustrates an example of when the user accesses or opens the menu switch 515 in order to see the child windows of the parent thumbnail window 418d. As shown, another information area 620 appears near the menu switch 515. Information area 620 may be an area separate form information area 410 or may be include within information area 410. Information area 620 is shown to include child thumbnail windows 621a and 621c. Similar to the manner in which a user can switch to a parent window, a user can choose one of the child windows 621a 621c to be displayed. The user may select one of the child windows by using her computer input device, such as a mouse or a keyboard. Similar to the thumbnail windows in information area 410, such as thumbnail image 412a, child thumbnail windows 621a, 621c may include a small version of an indicium 623a of the thumbnail window 621a overlaid over a corner of the thumbnail window. It should be understood that the child window visualizations may be displayed at the same time that the parent window visualizations are displayed and that the present invention is not so limited to the examples shown in FIGS. 5 and 6. Further, it should be understood that the child window representations may be displayed without displaying the corresponding parent window visualizations.

Figure 7:
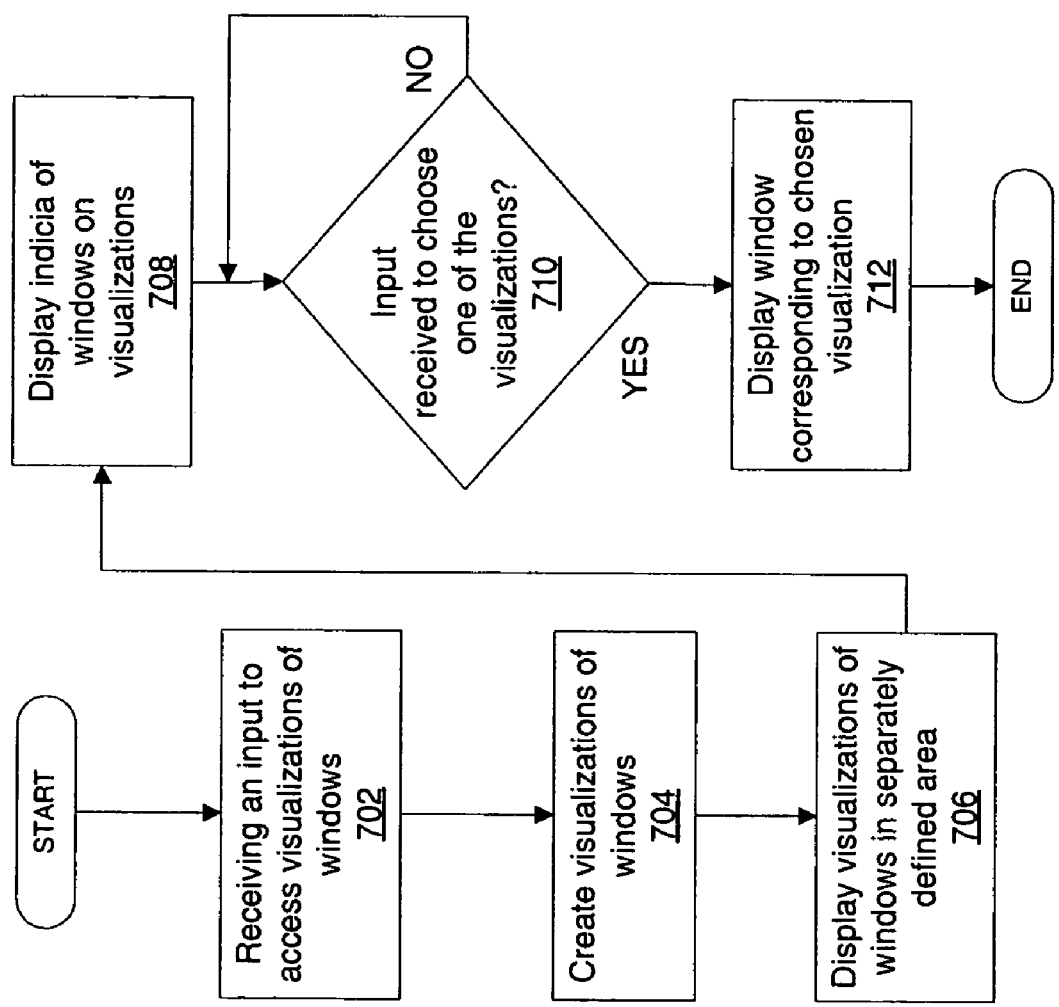
FIG. 7 is a flowchart of an illustrative example of a method for providing window information regarding multiple open windows in accordance with at least one aspect of the present invention.

FIG. 7 is a flowchart of an illustrative example of a method for providing window information regarding multiple open windows in accordance with at least one aspect of the present invention. The process starts and at step 702, an input is received requesting access to visualizations of the open windows within a desktop space. The input may be a signal corresponding to a depression of at least one activation switch on a computer input device. An activation switch may be a button on a mouse, a key on a keyboard, or some other type of switch. The input may also be an input received from a microphone corresponding to an audible input. The visualization may include thumbnail windows/images and each of the visualizations may be a different size than any other visualization.

The process moves to step 704 where the visualizations of the open windows are created. At step 706, the visualizations are then displayed in an area separately defined from the windows. For example, the visualizations may be displayed in an information area, such as information area 410, separately defined from any one of the windows. At step 708, an indicium corresponding to the window is displayed on the visualization. The indicium may be displayed on at least a portion of the visualization. Different indicia may be used for different application programs and the indicia may be customized by an application program and/or a user.

The process moves to step 710 where a determination is made as to whether an input has been received to choose one of the visualizations to switch to. If no input has been received, the process waits for an input. If an input is received, at step 712, the window corresponding to the chosen visualization is displayed at the top of the Z-order of the windows. The user has switched to the window corresponding to the chosen visualization.

Figure 8:
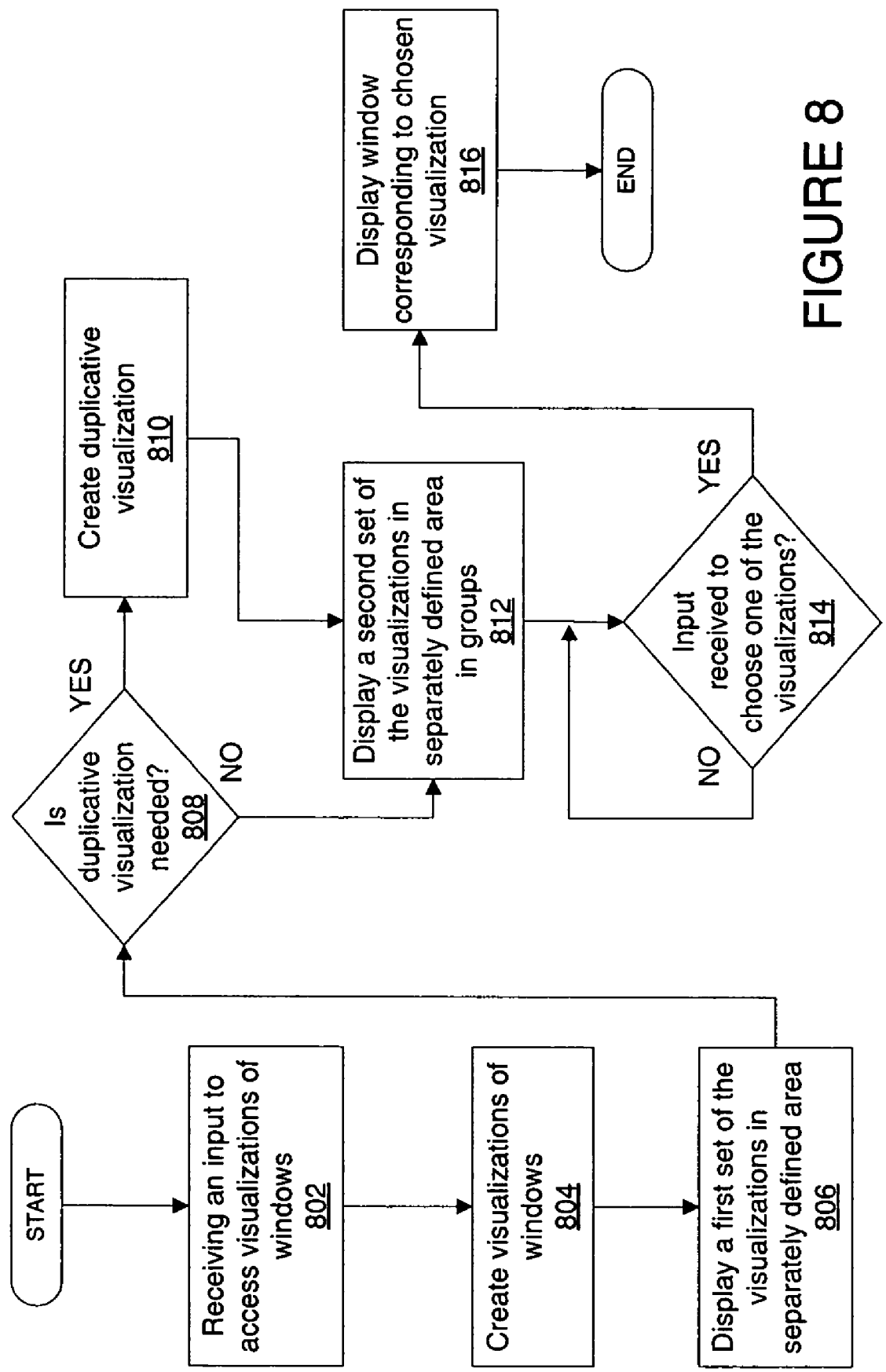
FIG. 8 is a flowchart of another illustrative example of a method for providing window information regarding multiple open windows in accordance with at least one aspect of the present invention.

FIG. 8 is a flowchart of another illustrative example of a method for providing window information regarding multiple open windows in accordance with at least one aspect of the present invention. In the example of FIG. 8, the process starts and at step 802, an input is received requesting access to visualizations of the open windows within a desktop space. At step 804 where the visualizations of the open windows are created. At step 806, a first set of the visualizations are then displayed in an area separately defined from the windows. The first set of visualizations may be the most recently accessed windows.

At step 808, a determination is made as to whether a duplicative visualization is needed. For example, the system may be configured to group all open windows by their application program in a second set of visualizations separate from the first set. If a duplicative visualization is not needed, the process moves to step 812. However, if a duplicative visualization is needed in step 808, the process moves to step 810 where a duplicative visualization is created. If more than one duplicative visualization is needed, multiple duplicates are created. At step 812, a second set of the visualizations are then displayed in the separately defined area. The second set of visualizations includes duplicative visualizations from step 810 and the visualizations within the second set may be grouped and/or ordered in accordance with a number of criteria, including common application program, similar file name, alphabetically, and/or a user specific criteria.

The process moves to step 814 where a determination is made as to whether an input has been received to choose one of the visualizations, whether from the first set or the second set. If an input has not been received, the process returns to step 814. If an input is received, at step 816, the window corresponding to the chosen visualization is displayed at the top of the Z-order of the windows. The user has switched to the window corresponding to the chosen visualization.

Figure 9:
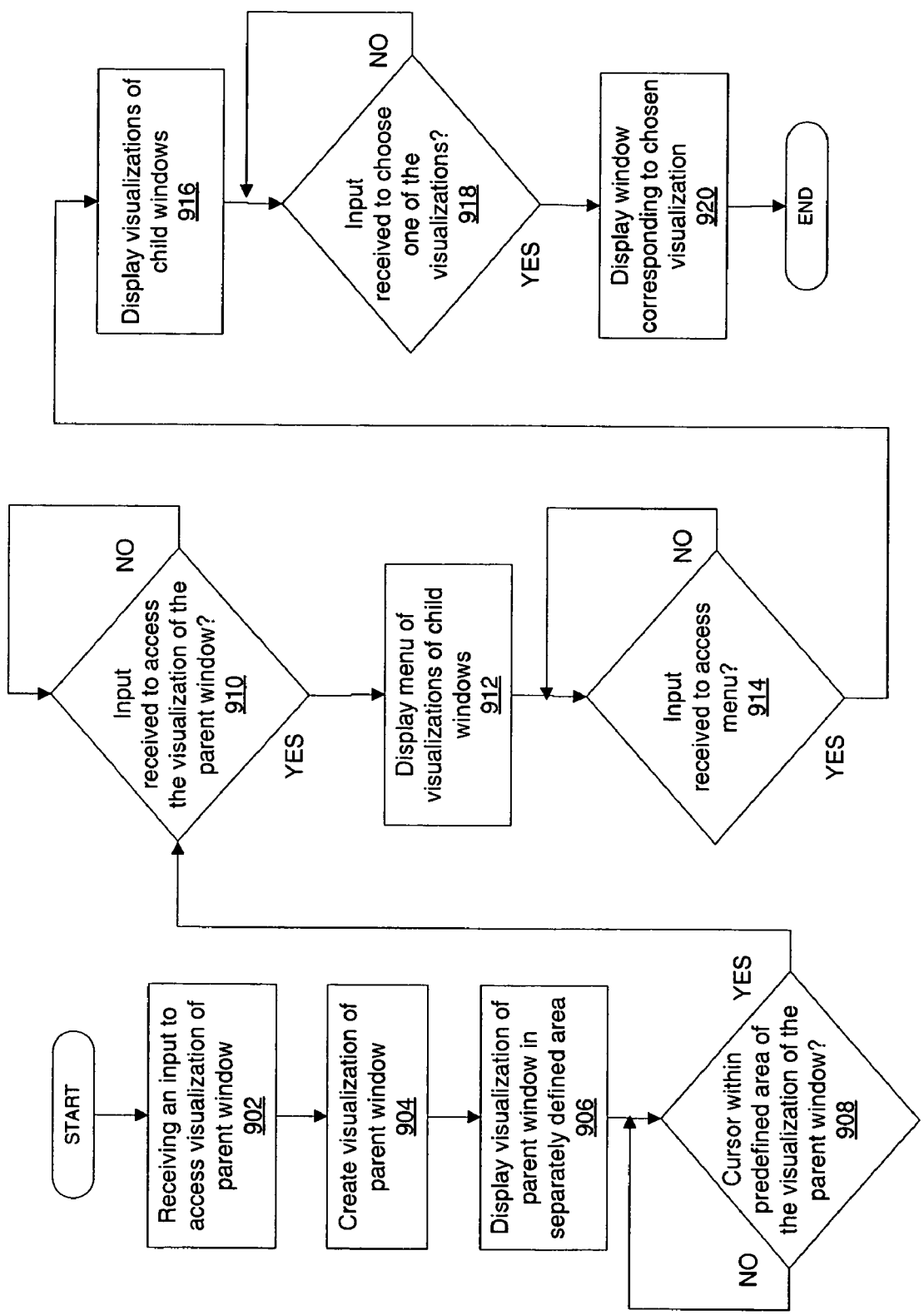
FIG. 9 is a flowchart of another illustrative example of a method for providing window information regarding a child window of a parent window in accordance with at least one aspect of the present invention.

FIG. 9 is a flowchart of another illustrative example of a method for providing window information regarding a child window of a parent window in accordance with at least one aspect of the present invention. The process starts and at step 902, an input is received requesting access to a visualization of a parent window. The process moves to step 904 where the visualization of the open parent windows is created. At step 906, the visualization of the open parent window is then displayed in an area separately defined from the windows. At step 908, a determination is made as to whether a mouse pointer is within a predefined area of the visualization of the parent window. The predefined area of the visualization may be the area of the visualization or may include an area around the visualization. If the mouse pointer is not within the predefined area, the process returns to step 908. If the mouse pointer is within the predefined area, the process moves to step 910.

At step 910, another determination is made as to whether an input has been received to access the visualization of the parent window. If not, the process returns to step 910. If an input has been received in step 910, the process moves to step 912 where a menu for accessing the visualizations of the child window(s) corresponding to the parent window is displayed. The menu may be a switch, a button, or a dropdown menu, among other types of interfaces. The process moves to step 914 where a determination is made as to whether an input has been received to access the menu. If no input is received, the process returns to step 914. If an input is received in step 914, the process moves to step 916.

At step 916, the visualization(s) of the open child window (s) is/are then displayed in an area separately defined from the windows. The visualization(s) of the child windows(s) may be displayed in the same area as the parent or in another separately defined area. The process moves to step 918 where another determination is made as to whether an input has been received to choose one of the visualization(s) of the child window(s). If not, the process returns to step 918. If an input is received, at step 920, the window corresponding to the chosen visualization of the child window is displayed at the top of the Z-order of the windows. The user has switched to the open child window corresponding to the chosen visualization.

With respect to an application programming interface (API), various aspects of the present invention may be performed by an API. For example, public APIs may interface with an operating system to allow an operating system to provide the various features of the present invention. In one embodiment, a software architecture for processing data representative of associated windows may include a component configured to associate a first open window and a second open window into a common open window and an application program interface to access the component. An API may receive a request to group two windows into a common window, access the necessary function(s) to perform the operation, and then send the results back to an operating system. The operating system may use the data provided from the API to perform the various features of the present invention.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for displaying at least one visualization on a display screen, the method comprising steps of:
receiving an input corresponding to a request to access visualizations of windows for a plurality of windows, the plurality of windows includes at least one parent window and a corresponding child window, wherein the corresponding child window includes a multiple document interface child window;
for each window of the plurality of windows, displaying a visualization of at least a portion of the content of the window in an area separately defined from the plurality of windows;
receiving a request to choose one of the visualizations;
displaying the window corresponding to the chosen visualization at the top of the Z-order of the plurality of windows; and
wherein the at least a portion of the content includes dynamic video content.

2. The method of claim 1, further comprising a step of displaying an indicium representative of the window on at least a portion of a thumbnail image for each window of the plurality of windows.

3. The method of claim 1, wherein at least one visualization has a different size from at least one other visualization.

4. The method of claim 3, wherein the size of the at least one visualization is customizable.

5. The method of claim 1, wherein the at least a portion of the content includes audio content.

6. A computer-readable storage medium comprising computer-executable instructions for performing the steps of claim 1.

7. A method for displaying at least one visualization of windows on a display screen, the method comprising steps of:
displaying a plurality of windows in a first area;
receiving an input corresponding to a request to access visualizations of windows for the plurality of windows, the plurality of windows includes at least one parent window and a corresponding child window, and wherein the corresponding child window includes a multiple document interface child window;
for each window of the plurality of windows, displaying a visualization of at least a portion of the content of the window in a second area separately defined from the plurality of windows in the first area;
wherein at least two visualizations are displayed in a group in the second area separate from at least one other visualization displayed in the second area; and
wherein the visualizations of windows are separate from and external to the plurality of windows.

8. The method of claim 7, further comprising a step of displaying a duplicate visualization, in the second area for at least one visualization.

9. The method of claim 7, wherein a first set of visualizations corresponding to the most recently accessed windows are displayed in a portion of a display screen separate from a second set of visualizations corresponding to all other open windows.

10. The method of claim 9, wherein at least one visualization in the first set is also in the second set.

11. The method of claim 7, wherein the at least two visualizations share a common application program.

12. The method of claim 7, wherein the at least two visualizations correspond to the parent window and at least one corresponding child window.

13. The method of claim 12, further comprising steps of:
displaying a menu of visualizations corresponding to the at least one corresponding child window;
receiving a request to access the menu; and
displaying the at least one corresponding child window.

14. A computer-readable storage medium comprising computer-executable instructions for performing the steps of claim 7.

15. A method for displaying at least one visualization of windows on a display screen, the method comprising steps of:
receiving an input corresponding to a request to access visualizations of windows for a plurality of windows, wherein the plurality of windows includes at least one parent window and a corresponding child window, and wherein the corresponding child window includes a multiple document interface child window;
displaying the visualization of the parent windows;
determining whether a cursor is within a predefined area of the displayed visualization of the parent window;
upon determining that the cursor is within the predefined area, displaying a menu related to at least one visualization of the corresponding child window;
receiving a request to access the menu;
displaying the at least one visualization of the corresponding child window; and
for each window of the plurality of windows, creating a visualization of at least a portion of the content of the window.

16. The method of claim 15, further comprising steps of:
receiving a request to choose at least one visualization; and
displaying the window corresponding to the chosen visualization at the top of the Z-order of the plurality of windows.

* * * * *